United States Patent
Isgar (10) Patent No.: US 11,508,272 B2
(45) Date of Patent: Nov. 22, 2022

(54) DISPLAY SYSTEM FOR A VEHICLE

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

(21) Appl. No.: 16/116,779

(22) Filed: Aug. 29, 2018

(65) Prior Publication Data

US 2019/0156714 A1 May 23, 2019

Related U.S. Application Data

(60) Provisional application No. 62/587,987, filed on Nov. 17, 2017.

(51) Int. Cl.
| | |
|---|---|
| *G09F 21/04* | (2006.01) |
| *G08G 1/09* | (2006.01) |
| *G06Q 30/02* | (2012.01) |

(52) U.S. Cl.
CPC ....... *G09F 21/048* (2013.01); *G06Q 30/0265* (2013.01); *G08G 1/093* (2013.01); *G08G 1/094* (2013.01)

(58) Field of Classification Search
CPC ............ G06Q 30/0266; G06Q 30/0265; G09F 21/04; G09F 21/048; G08G 1/094; G08G 1/093
USPC ................ 705/14.63, 14.43, 14.61; 701/31.4
See application file for complete search history.

(56) References Cited

U.S. PATENT DOCUMENTS

| | | | | |
|---|---|---|---|---|
| 6,236,652 | B1 * | 5/2001 | Preston ................. | G01S 5/0027 370/349 |
| 9,618,353 | B2 * | 4/2017 | Ruys ................... | H04W 64/006 |
| 2004/0148222 | A1 | 7/2004 | Sabella et al. | |
| 2006/0270421 | A1 * | 11/2006 | Phillips .............. | G08B 21/0272 455/457 |
| 2008/0140479 | A1 * | 6/2008 | Mello .................... | G06Q 30/02 705/14.54 |
| 2010/0042285 | A1 * | 2/2010 | Abernethy, Jr. .......... | G09F 9/35 701/31.4 |

(Continued)

FOREIGN PATENT DOCUMENTS

CA 2687576 A1 * 12/2008 ............. G06Q 30/02

OTHER PUBLICATIONS

Carla Fabiana Chiasserini, Advertisement Delivery and Display in Vehicular Networks: Using V2V Communications for Targeted Ads, 2017, p. 66, IEEE (Year: 2017).*

*Primary Examiner* — John Van Bramer
*Assistant Examiner* — Darnell A Pouncil
(74) *Attorney, Agent, or Firm* — Schmeiser, Olsen & Watts LLP (57) ABSTRACT

Described is a display system for a vehicle. The display system uses one or more active displays integrated into a new vehicle or coupled as an aftermarket product in an existing vehicle. The new vehicle with integrated displays of the system may be provided to a purchaser for a reduced cost for participation in the advertisement system. The system operates to provide nearby vehicle occupants, pedestrians, or others with advertisement and/or emergency messages using the displays. The display system can show advertising messages or emergency messages on the active displays that are relevant to the location of the vehicle. The system may operate to prioritize the advertisement messages or emergency messages that will be displayed based on determinations made by a server of the system.

4 Claims, 7 Drawing Sheets

(56) References Cited

U.S. PATENT DOCUMENTS

| | | | | |
|---|---|---|---|---|
| 2010/0138302 | A1* | 6/2010 | Park | G06Q 30/02 |
| | | | | 705/14.58 |
| 2010/0250368 | A1* | 9/2010 | Porco | H04W 4/18 |
| | | | | 705/14.58 |
| 2011/0055005 | A1* | 3/2011 | Lang | G06Q 30/02 |
| | | | | 705/14.45 |
| 2012/0054028 | A1* | 3/2012 | Tengler | G01C 21/3697 |
| | | | | 705/14.49 |
| 2013/0238440 | A1* | 9/2013 | Chatterjee | G09F 21/045 |
| | | | | 705/14.62 |
| 2014/0040016 | A1 | 2/2014 | Amla et al. | |
| 2014/0222582 | A1* | 8/2014 | Papalia | G06Q 30/0275 |
| | | | | 705/14.66 |
| 2014/0316900 | A1* | 10/2014 | Amla | G09F 21/04 |
| | | | | 705/14.63 |
| 2015/0106474 | A1* | 4/2015 | MacNeille | H04L 67/322 |
| | | | | 709/217 |
| 2015/0248703 | A1* | 9/2015 | Strode | G06Q 20/00 |
| | | | | 705/14.61 |
| 2016/0042401 | A1* | 2/2016 | Menendez | G06Q 30/0244 |
| | | | | 705/14.43 |
| 2016/0357782 | A1* | 12/2016 | Jones | G06F 16/29 |
| 2019/0228643 | A1* | 7/2019 | Demisse | G08G 1/017 |

* cited by examiner

FIG. 7

DISPLAY SYSTEM FOR A VEHICLE

CROSS REFERENCE TO RELATED APPLICATION[S]

This application claims priority to U.S. Provisional Patent Application entitled "DISPLAY SYSTEM FOR A VEHICLE," Ser. No. 62/587,987, filed Nov. 17, 2017, the disclosure of which is hereby incorporated entirely herein by reference.

BACKGROUND OF THE INVENTION

Technical Field

This invention relates to advertisements on a vehicle, and specifically to an active illuminating display on the exterior of a vehicle that displays advertisements and other messages.

State of the Art

Vehicle owners often look for ways to subsidize the cost of their vehicle. Some vehicle owners allow advertising to be placed on their vehicles as a way to generate income with their vehicle. Vehicle occupants are often looking for specific products or businesses in the area they are in. Billboards may not be providing the information a driver needs and further cannot incorporate technology to provide a fluid dynamic means of advertisement for modern society. In addition, vehicle occupants may benefit from receiving traffic or emergency messages that are pertinent to their location.

Accordingly, what is needed is a vehicle advertisement display system that utilizes technology to provide active, location-specific, timely, and relevant messaging and advertisements to motorists and others near the vehicle.

SUMMARY OF THE INVENTION

The disclosed invention relates to advertisements on a vehicle, and specifically to an active display on the exterior of a vehicle that displays advertisements and other messages. Disclosed is a display system for a vehicle. The display system includes at least one active display mounted to the vehicle. A processor is communicatively coupled to the display. The processor drives the display and provides content to be shown on the display. The processor is communicatively coupled to the internet, an advertisement signal receiver, an emergency signal receiver, and a location detector. The advertisement signal receiver, the emergency signal receiver, and the location detector all collect signals and information that the processor uses to generate messages to be displayed on the one or more displays.

In some embodiments, the processor can receive intelligence data from the internet including advertising identifier information, such as Identifier for Advertising (IDFA) for iOS devices or Google Advertising ID (AAID) for Android devices or the like, including such data from smart vehicles, related to smartphone or computing devices or smart vehicles that are located within a predetermined range of the vehicle in order to deliver targeted advertisements that are timely and relevant based on a potential shopper's age, gender, interests, education level, shopping preferences, shopping history patterns, and the like. The processor uses the intelligence data and advertisement signal information to generate relevant messages to be displayed on the one or more displays, on mobile or stationary smartphone or computing devices or on the interior displays of the smart vehicles that are located within the predetermined range of the vehicle.

A method of use of a display system for a vehicle is also disclosed. The method of use comprises driving a vehicle equipped with a display system for a vehicle; receiving location information from the location detector to the processor; receiving advertisement information from the advertisement signal receiver to the processor; receiving intelligence data from the internet to the processor; and delivering targeted information to the displays that is relevant to users of smartphone or other computing devices located within a predetermined range of the vehicle based on the intelligence data.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to advertisements on a vehicle, and specifically to an active display on the exterior of a vehicle that displays advertisements and other messages.

Existing geotargeting techniques include marketers using geofencing technology to send messages to smartphones and other computing devices, compatible with global positioning system (GPS) technology or radio frequency identification (RFID) technology, when the devices are located within a defined geographic area. For example, stores located in a shopping mall may target shoppers that arrive at the mall with specific advertising because those shoppers are geographically ready to make purchase decisions. Similarly, stores or other marketers, and even non-profit public-information-based entities, including government or other emergency communications entities, may target the occupants of vehicles that are driving within a defined geographic area.

One problem with geotargeted marketing is that members of the target audience must be able to look at their smartphones or other computing devices in order to receive the messages. If a smartphone or other computing device is in a pocket or purse, and not being used, there is no opportunity to reach the user of that device, even if the user is located within the defined geographic area. Further, making calls, checking email or text messaging don't allow for the right environment on a smartphone for targeted advertisements to be served. Often, occupants of vehicles that are located within the defined geographic area are not looking at their smartphones or other computing devices, particularly while driving. Similarly, other vehicle occupants may be either not using their devices, or using them for other purposes, such that they are unable to receive targeted messages at the appropriate time.

Another problem with geotargeted marketing is that messages are often inefficiently blanketed to all compatible devices within a defined geographic area without regard to personalized target audience data. For example, a potential shopper entering the defined geographic area may be annoyed by being bombarded with targeted ads that are irrelevant based on the potential shopper's age, gender, interests, education level, shopping preferences, shopping history patterns, and the like.

Vehicle owners sometimes allow advertisers to put ads on the exterior of their vehicle. The owner of the vehicle receives payment from the advertiser for showing the ads, which helps subsidize the cost of the vehicle. These advertisements have taken the form of static images that are painted or attached to the exterior of the vehicle.

Disclosed is a display system for a vehicle that uses active displays mounted to a vehicle to display advertisements to occupants of other vehicles. The display system for a vehicle can show advertisements and other messages that are visible to individuals exterior to the vehicle. The vehicle owner can be paid to show the advertisements on the display system for a vehicle. This will generate revenue for the vehicle owner or reduce the cost of ownership of the vehicle. Viewers of the advertisements may benefit from learning about local vendors from the display system.

The display system for a vehicle can display messages other than advertising messages. Vehicle occupants can sometimes benefit from receiving informational messages while they are driving. These messages can pertain to traffic or an emergency situation, for example. Traffic and emergency situations may include, but are not limited to a fire engine, police car, or ambulance needing to drive through traffic, weather hazards, accidents, Amber alerts, Silver alerts and the like. Static or active billboards are often used to convey messages to vehicle occupants, but these are only useful to vehicle occupants driving by the billboard. The disclosed display system for a vehicle uses active illuminating displays mounted to a vehicle to display emergency or informational messages to nearby vehicle occupants. The display system for a vehicle can show emergency messages visible to individuals exterior to the vehicle. Viewers of the emergency and informational messages can benefit from learning about traffic or other emergency situations that may affect them as they drive.

The disclosed display system for a vehicle includes at least one display mounted to the vehicle, and a processor coupled to the display that drives the display and provides messages for the display to show. The processor is coupled to the internet, an advertisement signal receiver, an emergency signal receiver, and a location detector. The advertisement signal receiver, the emergency signal receiver, and the location detector collect information used to generate messages to be shown on the display. The processor gathers information from the internet, the advertisement signal receiver, the emergency signal receiver, and the location detector, and sends this information to a server for processing and prioritizing of the type of message to send for display and create messages, and sends the messages for display on one or more displays coupled to the vehicle. Individuals around the vehicle, including other motorists or pedestrians, can obtain advertising, emergency situation, or other relevant useful information by reading the displays. The information shown in the displays can be coordinated with the location of the vehicle, so the advertising or emergency messaging is geographically relevant by use of geo-sensing or geo-fencing technology.

Figure 1:
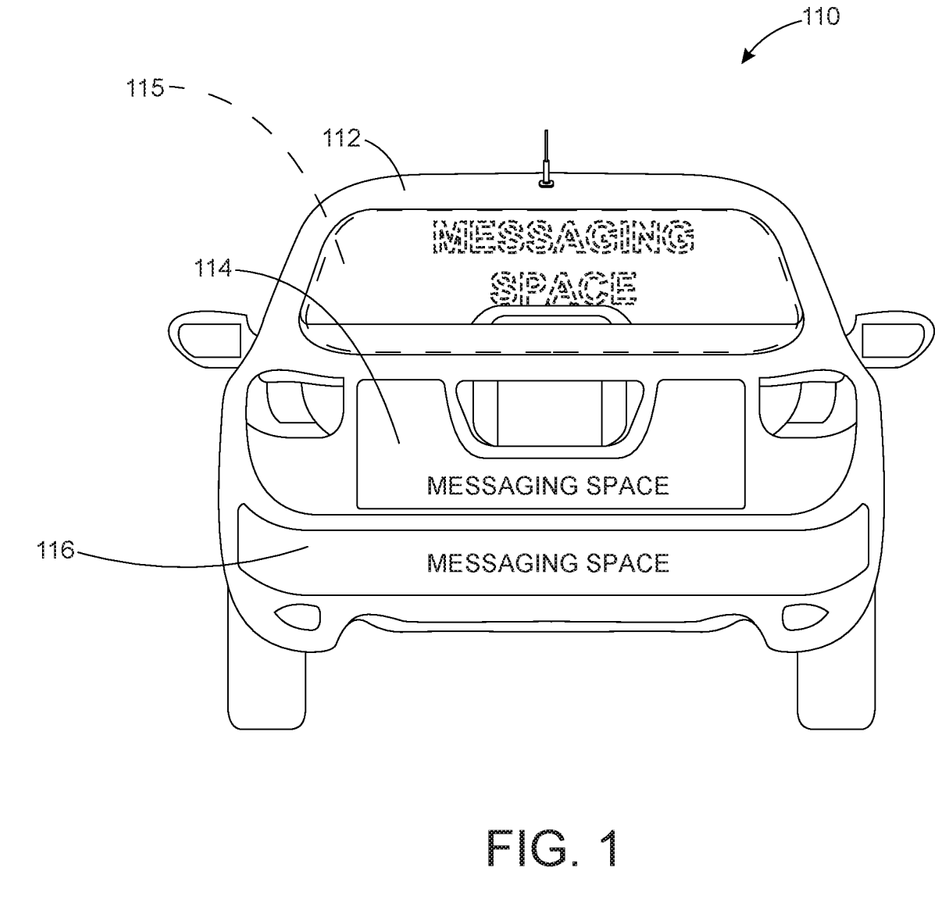
FIG. 1 shows a vehicle having a display system for a vehicle according to an embodiment.
Figure 2:
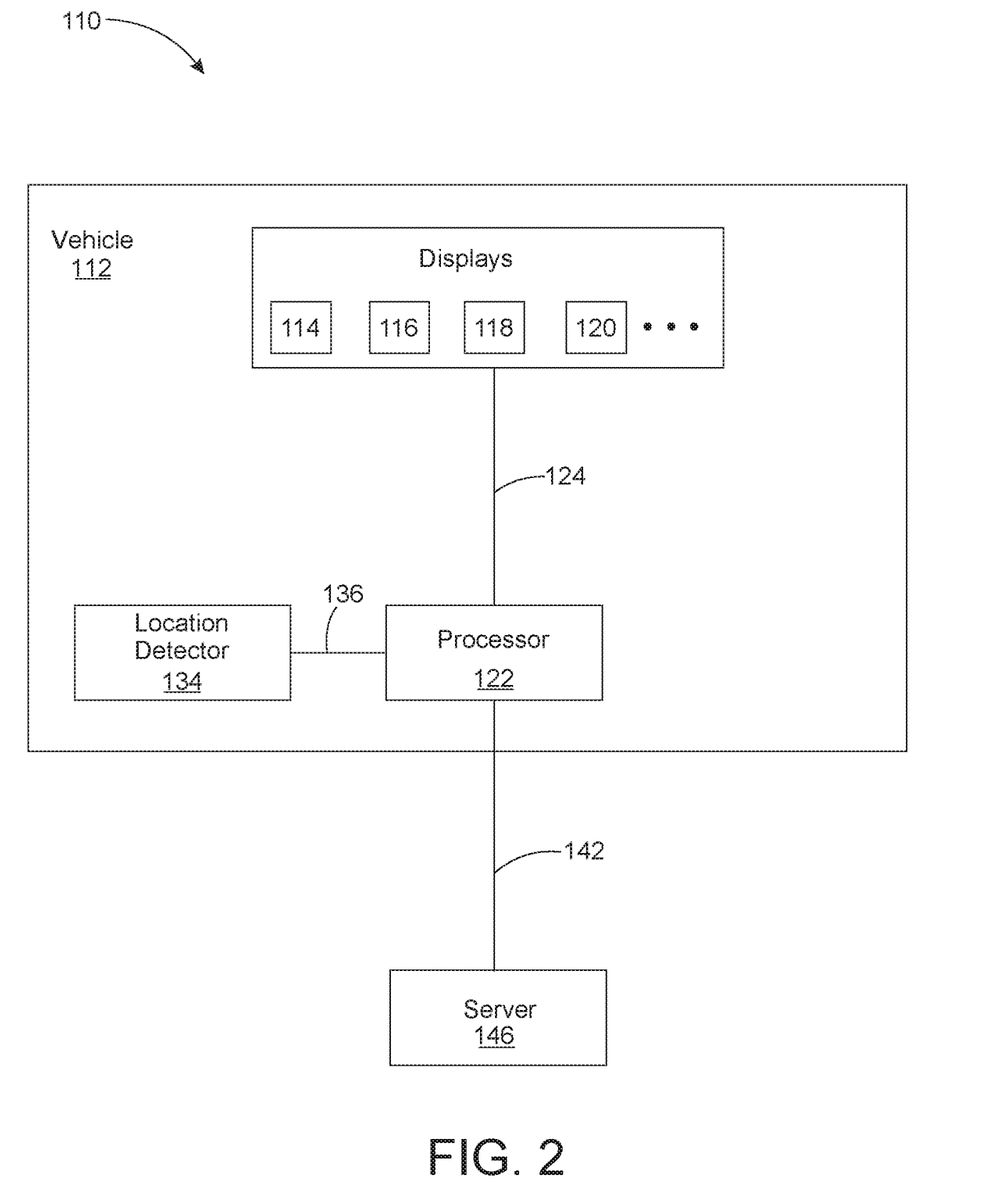
FIG. 2 shows a block diagram of a display system for a vehicle according to an embodiment.
Figure 4:
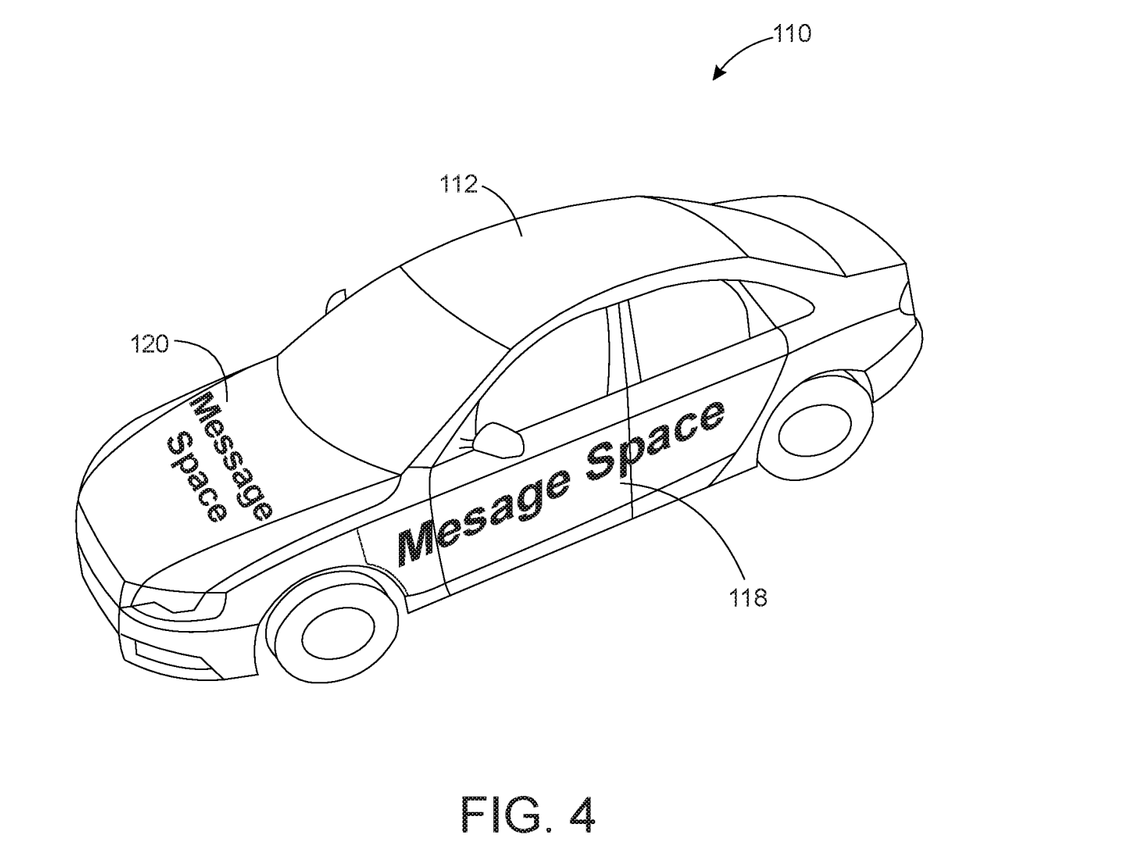
FIG. 4 depicts a display system for a vehicle with displays on various locations of the vehicle according to an embodiment.

FIGS. 1, 2 and 4 show an embodiment of a display system 110 for a vehicle 112. FIG. 1 shows a rear view of vehicle 112 with display system 110. FIG. 2 shows a simplified block diagram of display system 110. FIG. 4 shows a perspective view of vehicle 112 with display system 110. Display system 110 includes one or more displays. In the embodiment shown, display system 110 includes four displays, display 114, display 116, display 118, and display 120, as shown in FIGS. 1 and 4. Each one of displays 114, 116, 118, and 120 are mounted to the vehicle 112 and can be seen by observers. Displays 114, 116, 118, and 120 are light-emitting diode (LED) displays in this embodiment, but this is not meant to be limiting. Displays 114, 116, 118, and 120 can be any type of active display. An active display is a display with active pixels that allows the image or message on the display to change over time. Displays 114, 116, 118, and 120 can be any active light-emissive display, light-reflective display, or other type of active display known now or in the future for displaying an active image. Displays 114, 116, 118, and 120 may display words, images, videos or combinations thereof that are viewed by vehicle occupants, pedestrians, or other individuals around vehicle 112. Displays 114, 116, 118, and 120 display advertising messages, emergency messages, or any other type of message. A message can be a written word or words, or an image.

Displays 114, 116, 118, and 120 may be mounted anywhere on vehicle 112 in this embodiment as shown in FIGS. 1 and 4, with the intent of having displays 114, 116, 118, and 120 be visible to a maximum number of people.

Displays 114, 116, 118, and 120 can be installed on vehicle 112 that is a new vehicle built at the factory, or, displays 114, 116, 118, and 120 can be aftermarket products installed after vehicle 112 is manufactured. In embodiments where the displays 114,116, 118 and 120 are installed on a new vehicle 112 at the factory, the displays may be integral with the vehicle and include such things as curved surfaces to allow for the displays to follow the contour of the vehicle. This allows the system 110 to have a seamless integration with the vehicle 112. In these embodiments, if the displays are not active, the vehicle 112 may appear as a typical vehicle of the same make and model. Then when the displays are active, the advertisement messages or emergency messages may be displayed. Further, in aftermarket embodiments, the displays 114,116, 118 and 120 may be installed on an existing vehicle 112, wherein the displays may be rigid rectilinear displays or include such things as curved surfaces to allow for the displays to follow the contour of the vehicle. Additionally, replacement vehicle components with integrated displays may be utilized to incorporate displays into existing vehicles.

Displays 114, 116, 118, and 120 can display many different types of messages, images, videos or combinations thereof. The owner of vehicle 112 may be compensated for showing advertisements on one or more of displays 114, 116, 118, and 120. This can help offset the cost of vehicle 112.

For example, a vehicle purchaser may have the option of purchasing a particular make and model vehicle that is standard and pay full price, or one that is equipped with the display system 110 of this invention and pay a reduced cost for participation in the advertisement system. In some embodiments, the cost of the vehicle 112 may be reduced by subsidizing the cost of the vehicle by paying the vehicle manufacturer, retailer, lender or the like from revenue generated from the advertisement system 110.

Figure 3:
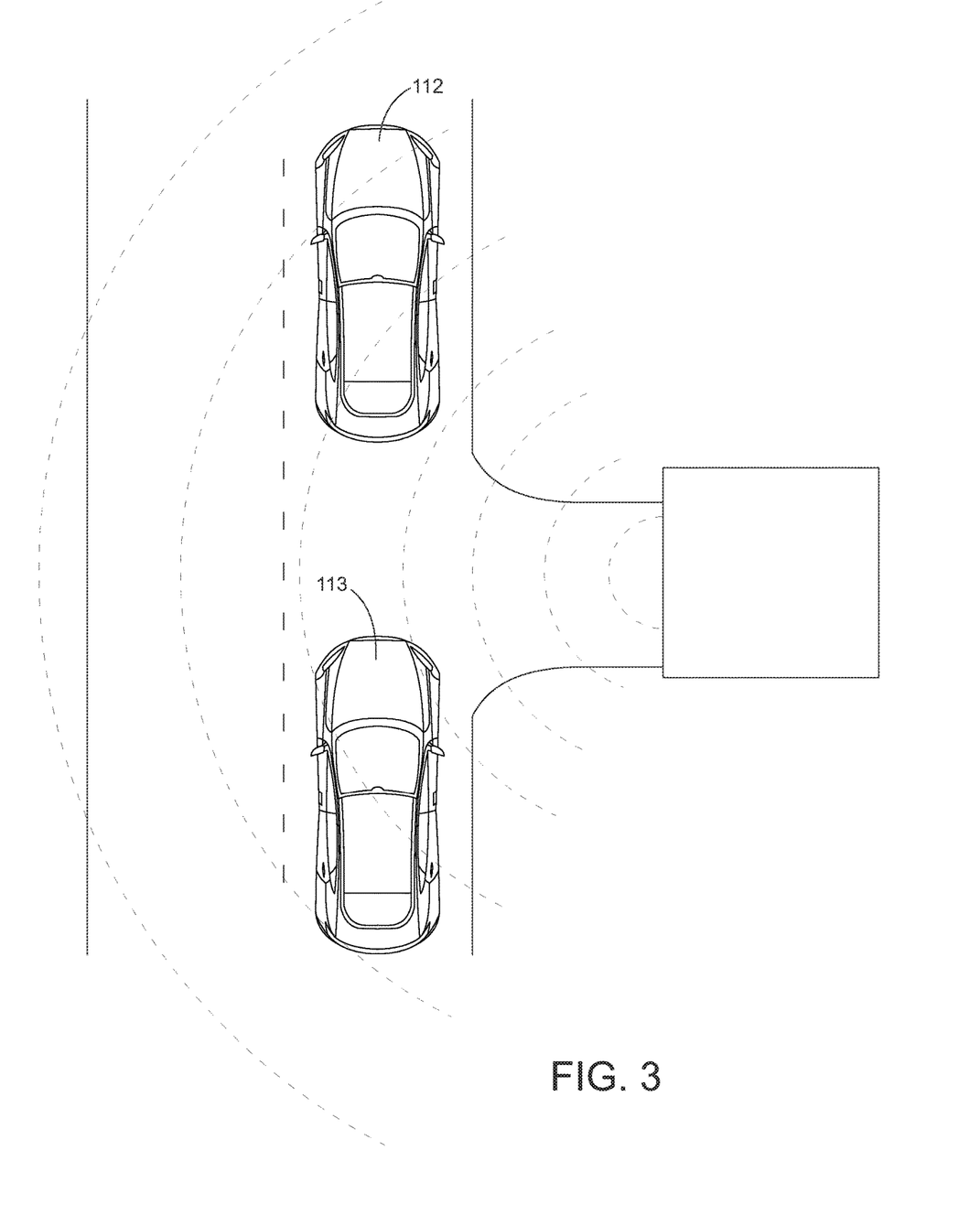
FIG. 3 depicts a display system for a vehicle entering a geofence of a business according to an embodiment.

The advertisements can change over time and location. Display system 110 can use geo-sensing to show location-relevant advertisements, as depicted in FIG. 3. The advertisements can be coordinated with the location of vehicle 112 so the other vehicle 113 occupants can get information relevant to their location, such as "Take exit 225 to get Bob's Burgers", for example.

Displays 114, 116, 118, and 120 can show emergency messages telling of traffic events or other important information that vehicle occupants around vehicle 112 may be interested to know. The emergency messages can be coordinated with the location of vehicle 112 so that nearby vehicle occupants or pedestrians are getting location specific information. Displays 114, 116, 118, and 120 can also be made to show emergency messages from the occupants of vehicle 112 such as "call police" or "need help", for example. Displays 114, 116, 118, and 120 can show messages sent from nearby police or emergency vehicles.

Vehicle 112 is a sedan-type vehicle in FIG. 1, but this is not meant to be limiting. Vehicle 112 can be any type of wheeled vehicle, flying vehicle, floating vehicle, or any other type of vehicle.

FIG. 2 shows a simplified block diagram of display system 110. Display system 110 includes displays 114, 116, 118, and 120, which are coupled to vehicle 112. Displays 114, 116, 118, and 120 are each communicatively coupled to a processor 122 using communication link 124. Processor 122 is coupled to a server 146, such as, but not limited to, by a network connection, such as through an Internet connection 142, wherein the processor 122 may communicate with and receive communication from the server 146. Server 146 may be a computer server, a cloud server and the like. Processor 122 includes the display drivers for each of displays 114, 116, 118, and 120. Processor 122 operates to enable display of the messages, images, videos or combinations thereof for each of displays 114, 116, 118, and 120.

Display system 110 includes a location detector 134 communicatively coupled to processor 122 via a communication link 136. In some embodiments, location detector 134 operates to determine the location of the vehicle 112, such as by use of a global positioning sensor. Location detector 134 sends location information to the processor 122 that then sends location information to the server 146. The server 146 processes the location information and determines messages relevant to the location information for display on displays 114, 116, 118, and/or 120. The server 146 processes the location information along with all other types of information received to determine location-based advertisements, location-based emergency messages, or other location dependent content. Location detector 134 may be utilized for sending or receiving location-related information, for communicating with location satellites, or for any other location communications relevant to display system 110.

Communication links 124, 136, and 142 can be wired or wireless communication links and can use any communication protocol known now or in the future for communications.

The server 146 includes a memory for storing advertisement data and emergency message data corresponding to the system 110. Advertisement data may include national advertisement information for particular companies or goods that pay or are otherwise a part of the system 110, local advertisement information for local businesses and may include location information of the business, contact information for the local business, a geofence size and/or radius of the local business and content to display on the displays 114, 116, 118 and 120 for local businesses that pay or are otherwise a part of the system 110. Emergency message data stored on the server 146 may be updated regularly with up-to-date emergency information including accidents, traffic jams, weather conditions, road closures, emergency response routes, and the like.

Figure 5:
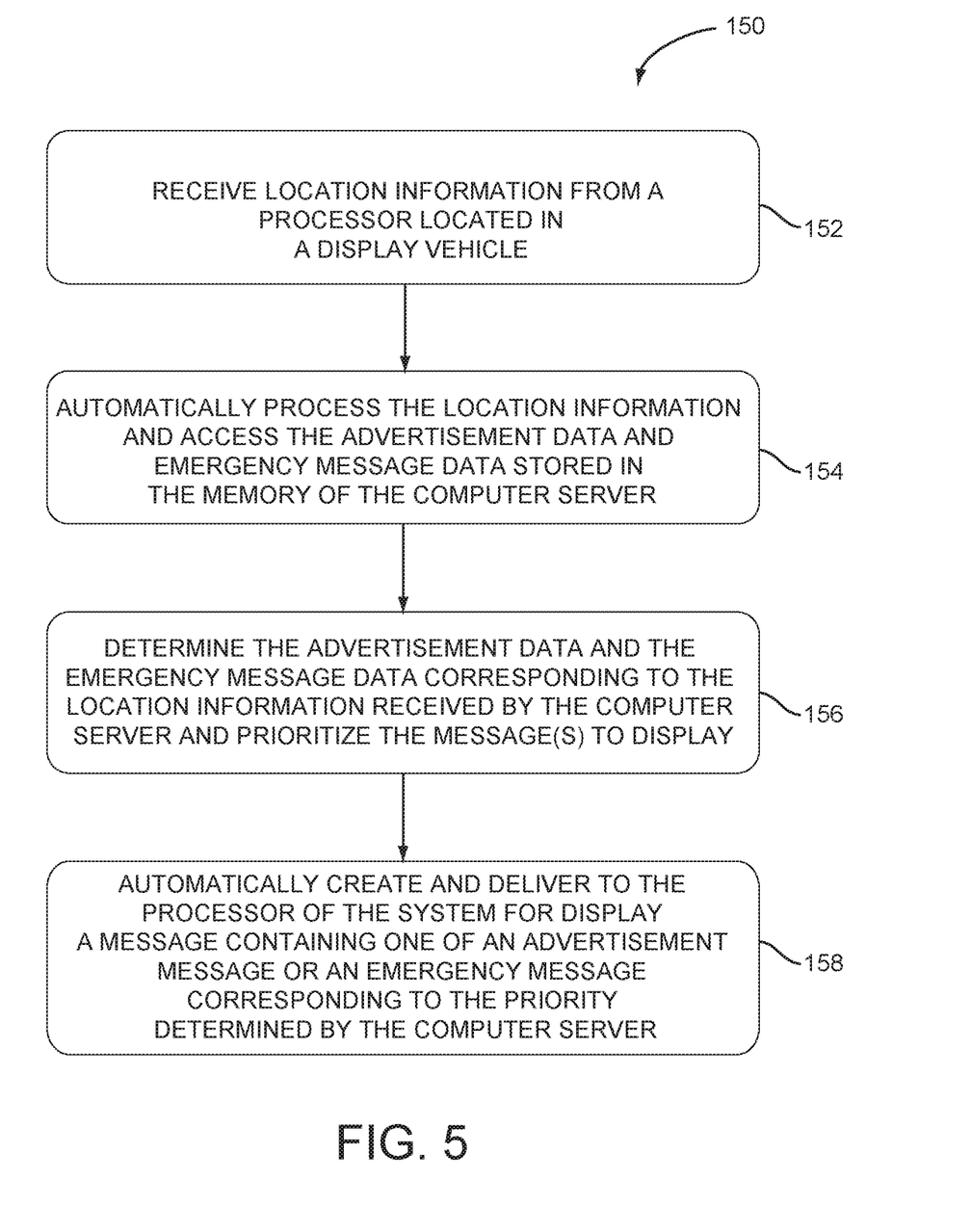
FIG. 5 depicts a method of use of a display system for a vehicle according to an embodiment.

FIG. 5 illustrates a flow chart of programmed instructions 150 of a display system for a vehicle, the programmed instructions being located on the server 146 such that the server is programmed to perform certain functions. The server 146 may be programmed to receive location information from a processor located within a display vehicle 112 (Step 152); automatically process the location information and access the advertisement data and emergency message data stored in the memory of the server 146 (Step 154); determine the advertisement data and the emergency message data corresponding to the location information received by the server and prioritize the message(s) to display (Step 156); and automatically create and deliver to the processor of the system for display a message containing one of an advertisement message or an emergency message corresponding to the priority determined by the server (Step 158).

The priority of the message may be determined by the server 146, wherein the server 146 may be programmed to determine an advertiser from the advertisement data that has paid for a higher priority of advertisement within a geographic location associated with the location information received by the server 146. Further, the server 146 may be programmed to adjust the priority in response to the emergency data associated with the location information. For example, certain urgent emergency data may be assigned a higher priority over advertisement messages because of the urgency of the emergency data. This urgent emergency data may include data automatically received by the system 110 from governmental emergency alert systems, such as, but not limited to, Emergency Broadcast System, Emergency Alert System, Wireless Emergency Alerts system and the like supplying immediate emergency information. The emergency message data from these and other sources may include 1) Alerts issued by federal, state or local authorities; 2) Alerts involving imminent threats to safety or life; and 3) Amber Alerts. The emergency message data of this type would receive a higher priority over the advertisement data. It will be understood that there may be other factors that determine the priority, particularly if there are multiple local businesses that have paid for the same priority, wherein the server 146 may be programmed to assign a priority in such a manner to provide substantially equal display on vehicles. This may include, but is not limited to, rotating advertisements in a predetermined order, displaying for a predetermined amount of time, or the like.

In embodiments, the message with the highest priority is sent for display. In other embodiments, both the advertisement message and the emergency message may be created and sent in a particular order of display, time of display, frequency of display or the like on the displays of the system based on the priority of each message as determined by the server. In embodiments, the higher the priority as determined by the server 146 results in being the first message displayed, the most frequent message displayed and the longest amount of time of display of the message, and the like.

Additionally, the displays 114, 116, 118, and 120 can operate simultaneously or not simultaneously to display the same message, parts of the same message or different messages that are unrelated advertisements and/or emergency messages. The display 114, 116, 118 or 120 selected to display each message of a plurality of messages may be determined by the server 146 based on priority. For example, the rear of the vehicle 112 may have a higher priority since it will be the easiest to view, followed by a hood of the vehicle 112 and then sides of the vehicle 112.

Delivering prioritized messages based on received information by the server through the processor to the displays on the vehicle allows other drivers, other occupants of nearby vehicles, or any other mobile or stationary individuals, that are located within a predetermined range of the vehicle to see the information by viewing the displays.

Figure 6:
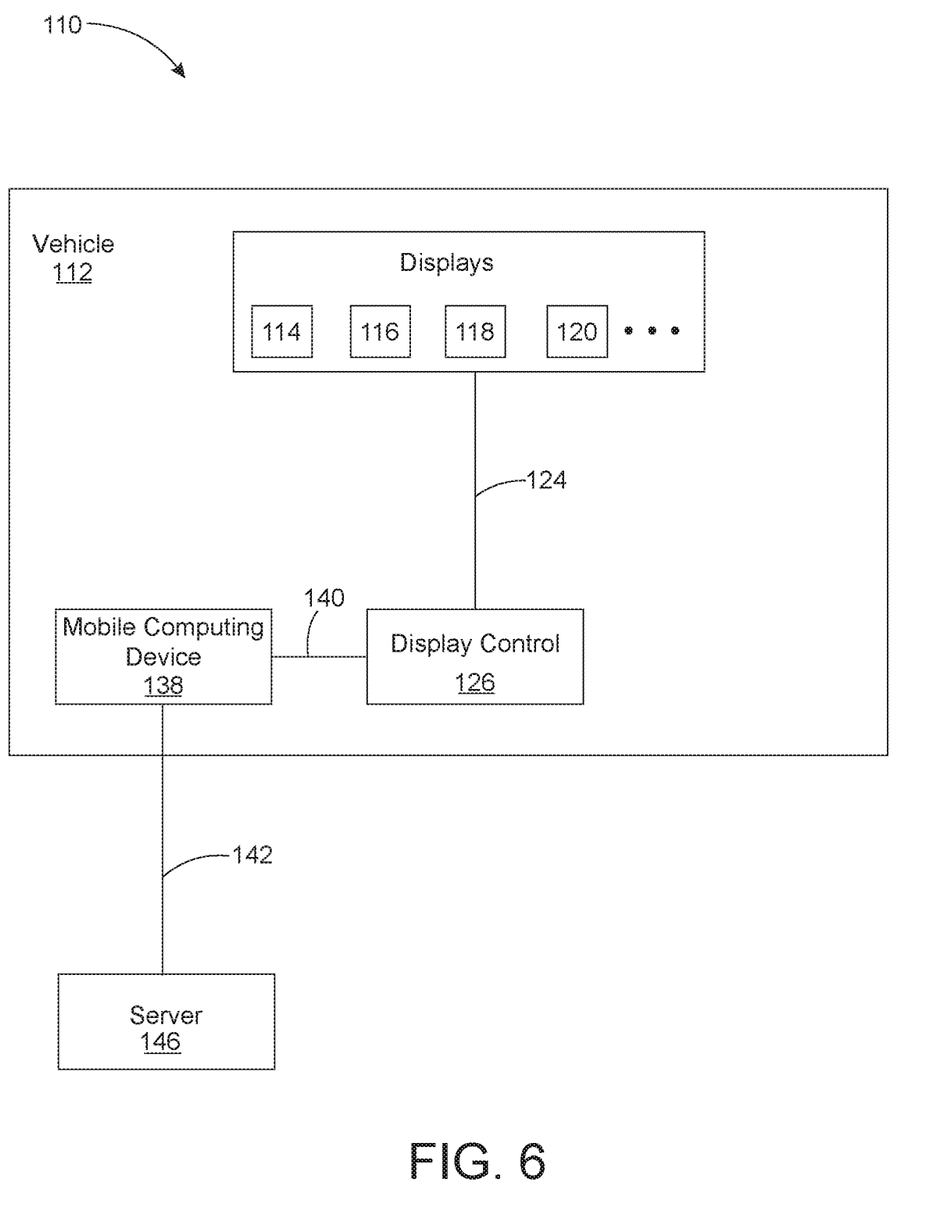
FIG. 6 shows a block diagram of another embodiment of a display system for a vehicle according to an embodiment.

In another embodiment depicted in FIG. 6, depicted is a simplified block diagram of display system 110. Display system 110 includes displays 114, 116, 118, and 120, which are coupled to vehicle 112. Displays 114, 116, 118, and 120 are each communicatively coupled to a display control 126 using communication link 124. Mobile computing device 138 is coupled to a server 146, such as, but not limited to, by a network connection, such as through an Internet connection 142, wherein the mobile computing device 138 may communicate with and receive communication from the server 146. Mobile computing device 138 may operate a mobile application or web application that establishes a communication link 142 between the mobile computing device 138 and the server 146. Display control 126 includes the display drivers for each of displays 114, 116, 118, and 120. Display control 126 operates to receive the advertisement or emergency message from the mobile computing device to display on one or more of the displays 114, 116, 118, and 120. Mobile computing device 138 operates to enable display of the messages, images, videos or combinations thereof for each of displays 114, 116, 118, and 120 by communication of such messages to the display control 126 through communication link 140.

Mobile computing device 138 may include a location detector incorporated within the hardware and software of the mobile computing device 138. In these embodiments, mobile computing device 138 operates to determine the location of the mobile computing device 138 that thereby determines the location of the vehicle 112 by virtue of the mobile computing device 138 being located within the vehicle 112 while the vehicle 112 is driven. The hardware and software performing the location detection may be a global positioning sensor and associated software. Mobile computing device 138 sends location information to the server 146. The server 146 processes the location information and determines messages relevant to the location information for display on displays 114, 116, 118, and/or 120. The server 146 processes the location information along with all other types of information received to determine location-based advertisements, location-based emergency messages, or other location-dependent content. Mobile computing device 138 is utilized for sending or receiving location-related information, for communicating with location satellites, or for any other location communications relevant to display system 110. Additionally, mobile computing device 138 is utilized as the communication means of sending messages to the display control for display.

The server 146 includes a memory for storing advertisement data and emergency message data corresponding to the system 110. Advertisement data may include national advertisement information for particular companies or goods that are part of the system 110, such as those business who pay to advertise with the system 110, local advertisement information for local businesses and may include location information of the business, contact information for the local business, a geofence size, and/or radius of the local business and content to display on the displays 114, 116, 118 and 120 for local businesses that are part of the system 110, such as those businesses who pay to advertise with the system 110. Emergency message data stored on the server 146 may be updated regularly with up-to-date emergency information including accidents, traffic jams, weather conditions, road closures, emergency response routes, and the like.

Figure 7:
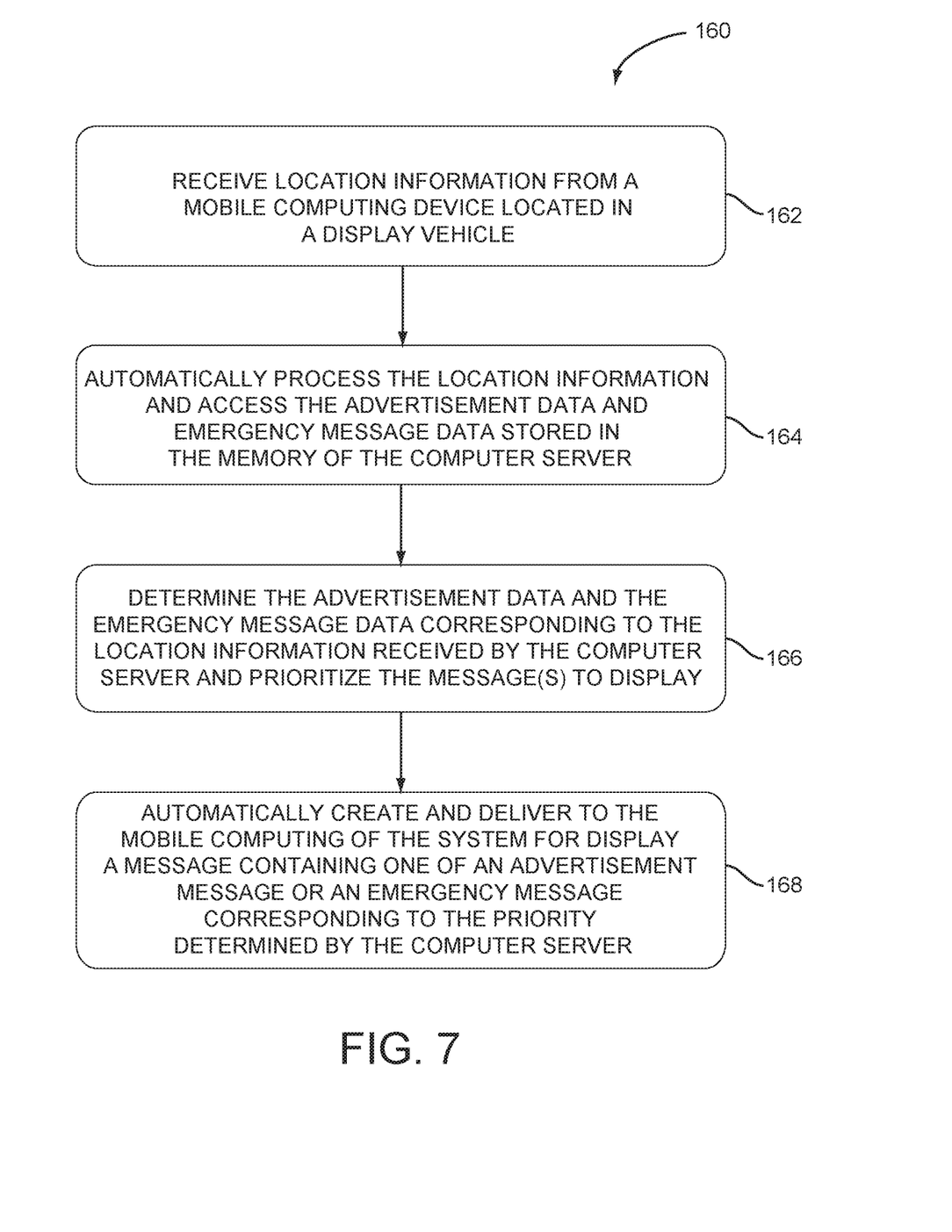
FIG. 7 depicts a method of use of the display system for a vehicle of FIG. 6 according to an embodiment.

FIG. 7 illustrates a flow chart of programmed instructions 160 of a display system for a vehicle, the programmed instructions being located on the server 146 such that the server is programmed to perform certain functions. The server 146 may be programmed to receive location information from a mobile computing device 138 located within a display vehicle 112 (Step 162); automatically process the location information and access the advertisement data and emergency message data stored in the memory of the server 146 (Step 164); determine the advertisement data and the emergency message data corresponding to the location information received by the server and prioritize the message(s) to display (Step 166); and automatically create and deliver to the mobile computing device of the system for display a message containing one of an advertisement message or an emergency message corresponding to the priority determined by the server (Step 168), wherein the mobile computing device sends the message for display to the display control for display on at least one display of the display vehicle.

The priority of the message may be determined by the server 146, wherein the server 146 may be programmed to determine an advertiser from the advertisement data that has paid for a higher priority of advertisement within a geographic location associated with the location information received by the server 146. Further, the server 146 may be programmed to adjust the priority in response to the emergency data associated with the location information. For example, certain urgent emergency data may be assigned a higher priority over advertisement messages because of the urgency of the emergency data. This urgent emergency data may include data automatically received by the system 110 from governmental emergency alert systems, such as, but not limited to, Emergency Broadcast System, Emergency Alert System, Wireless Emergency Alerts system, and the like, supplying immediate emergency information. The emergency message data from these and other sources may include 1) Alerts issued by federal, state or local authorities; 2) Alerts involving imminent threats to safety or life; and 3) Amber Alerts. The emergency message data of this type would receive a higher priority over the advertisement data. It will be understood that there may be other factors that determine the priority, particularly if there are multiple local businesses that have paid for the same priority, wherein the server 146 may be programmed to assign a priority in such a manner to provide substantially equal display on vehicles. This may include, but is not limited to, rotating advertisements in a predetermined order, displaying for a predetermined amount of time, or the like.

In embodiments, the message with the highest priority is sent for display. In other embodiments, both the advertisement message and the emergency message may be created and sent in a particular order of display, time of display, frequency of display or the like on the displays of the system based on the priority of each message as determined by the server. In embodiments, the higher the priority as determined by the server 146 results in being the first message displayed, the most frequent message displayed and the longest amount of time of display of the message, and the like.

Additionally, the displays 114, 116, 118, and 120 can operate to simultaneously or not simultaneously display the same message, parts of the same message or differing messages that are unrelated advertisements and/or emergency messages. The display 114, 116, 118 or 120 selected to display each message of a plurality of messages may be determined by the server 146 based on priority. For example, the rear of the vehicle 112 may have a higher priority since it will be the easiest to view, followed by a hood of the vehicle 112 and then sides of the vehicle 112.

Delivering prioritized messages based on received information by the server through the mobile computing device through the processor to the displays on the vehicle allows other drivers, other occupants of nearby vehicles, or any other mobile or stationary individuals, that are located within a predetermined range of the vehicle to see the information by viewing the displays.

Further, the display system 110 in all embodiments may be manually disengaged by the operator or may be automatically disengaged through software programming, wherein the displays do not display any messages. This is an important feature for instances where display of advertisement or emergency messages may not be desired, such as, but not limited to, a funeral procession, a child pick-up line at school, and the like, or to be in accordance with regulatory requirements, and the like, where disengagement of the system 110 is required. In embodiments, the system 110 may be programmed to automatically disengage when the location of the vehicle 112 is within a geofence established by regulatory requirements and the like.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A display system for a vehicle, the display system comprising:
   a plurality of displays coupled to an exterior of the vehicle;
   a processor coupled to the plurality of displays;
   a location detector coupled to the processor, wherein the location detector sends location information to the processor;
   a server coupled to the processor with a network connection, the server having a memory, wherein the server is programmed to:
      receive advertisement message data comprising local advertisement information for two or more local businesses, wherein the local advertisement information comprises a priority level for the local advertisement information from each of the two or more local businesses and at least one of contact information, a geofence size and/or radius, and content to display for each business of the local businesses;
      store the advertisement message data;
      receive the location information from the processor coupled to the vehicle;
      automatically process the location information;
      automatically access the advertisement message data stored in the memory of the server;
      determine the local advertisement information for the two or more local businesses in the advertisement message data corresponds to the location information received by the server;
      identify the local advertisement information of the two or more local businesses in the advertisement message data to display within a geographic location associated with the location information received by the server;
      prioritize the local advertisement information of the two or more local businesses in advertisement message data based on the priority level for the local advertisement information from each of the two or more local businesses;
      receive emergency message data corresponding to the location data;
      adjust the priority level of each of the local advertisement information of the two or more local businesses;
      assign the emergency message data a higher priority than the adjusted priority level of each of the local advertisement information of the two or more local businesses;
      automatically create for display the emergency message data and at least one of the local advertisement information for the two or more local businesses based on the adjusted priority level and
      deliver to the processor of the system the emergency message data followed by the at least one of the local advertisement information for the two or more local businesses, wherein the order of delivery of the at least one of the local advertisement information for the two or more business is based on the adjusted priority level;
   displaying, via the processor coupled to the plurality of displays, the emergency message first followed by the at least one of the local advertisement information for the two or more local businesses on the plurality of displays, wherein the order of display for the at least one of the local advertisement information for the two or more local businesses is based on the adjusted priority level.

2. The display system of claim 1, wherein the location detector is a global positioning sensor.

3. The display system of claim 2, further comprising a mobile computing device located within the vehicle coupled to the display control, the mobile computing device comprising the global positioning sensor.

4. The display system of claim 1, wherein the emergency message data comprises emergency information including accidents, traffic jams, weather conditions, road closures, emergency response routes, critical emergency data including alerts issued by federal, state or local authorities, alerts involving imminent threats to safety or life, or Amber alerts, or combinations thereof.

* * * * *